(12) United States Patent
Huang

(10) Patent No.: US 7,930,809 B2
(45) Date of Patent: Apr. 26, 2011

(54) BOOT SLIDER

(75) Inventor: Chia-Hao Huang, Taiping (TW)

(73) Assignee: Yakita Metal Industry Co., Ltd., Taiping (TW)

( * ) Notice: Subject to any disclaimer, the term of this patent is extended or adjusted under 35 U.S.C. 154(b) by 461 days.

(21) Appl. No.: 12/099,193

(22) Filed: Apr. 8, 2008

(65) Prior Publication Data

US 2009/0249600 A1    Oct. 8, 2009

(51) Int. Cl.
*B23P 19/02* (2006.01)
(52) U.S. Cl. ................... 29/235; 29/237; 29/239
(58) Field of Classification Search .......... 29/235, 29/237, 239
See application file for complete search history.

(56) References Cited

U.S. PATENT DOCUMENTS

| | | | | |
|---|---|---|---|---|
| 2,762,383 | A | * | 9/1956 | Wittman .......................... 135/28 |
| 4,291,454 | A | * | 9/1981 | Sawaryn ...................... 29/426.6 |
| 6,976,296 | B2 | * | 12/2005 | Boudreault ..................... 29/235 |
| 2004/0177485 | A1 | * | 9/2004 | Lihod ............................. 29/450 |

\* cited by examiner

*Primary Examiner* — Joseph J Hail, III
*Assistant Examiner* — Shantese McDonald
(74) *Attorney, Agent, or Firm* — Alan Kamrath; Kamrath & Associates PA

(57) ABSTRACT

A boot slider includes a body including a compartment. A piston is disposed in the compartment and is moveable between a first position and a second position. A cap is mounted in the compartment in order to restrain movement of the piston. A plurality of arms is connected together by a ring, and the ring is adapted to be retained on the cap. The arms are closed when the piston is in the first position, and the arms are urged open when the piston is in the second position.

19 Claims, 10 Drawing Sheets

BOOT SLIDER

BACKGROUND OF THE INVENTION

1. Field of the Invention

The present invention relates to a boot slider which can be used to install or uninstall dust boots on an automobile.

2. Description of the Related Art

U.S. Pat. No. 6,976,296 to Boudreault discloses a constant velocity (CV) boot installer for motor vehicles. The CV boot installer includes arms which can be rotated open by an adjustor for tensioning a boot installed thereon. In Boudreault, the arms are attached to the boot slider via springs. This method is time-consuming and laborious. Furthermore, this installation of the arms is liable to have some arms opened in different degrees with the other. Furthermore, maintaining the springs is not easy.

The present invention is, therefore, intended to obviate or at least alleviate the problems encountered in the prior art.

SUMMARY OF THE INVENTION

It is therefore an object of the present invention to provide a boot slider that has arms which can be installed and uninstalled easily.

It is another object of the present invention to provide a boot slider that has arms connected together and less liable to have occurrences in which some arms are not opened to the same degree as the others.

It is yet another object of the present invention to provide a boot slider that has the number of components required for installation of the arms substantially reduced.

It is a further object of the present invention to provide a boot slider having a piston precluded from being fretted by arms.

Accordingly, the object is achieved by providing a boot slider, in which the boot slider comprises a body, a piston disposed in the body and moveable between a first position and a second position, a cap mounted in the body in order to restrain movement of the piston, and a plurality of arms held together by a ring. The arms are closed when the piston is in the first position and are urged open when the piston is in the second position.

Accordingly, the object is achieved by providing a boot slider including a body, a piston disposed in the body and moveable between a first position and a second position, a cap mounted in the body in order to restrain movement of the piston, and a plurality of arms held together by a ring. The arms are closed when the piston is in the first position and are urged open when the piston is in the second position.

The cap includes a plurality of slots in which the plurality of arms can be inserted respectively. Specifically, each arm includes a proximal end and a distal end, and the distal end of the arm is inserted through the associated slot. The ring that holds the plurality of arms together is inserted through the proximal ends of the arms. Furthermore, the ring is adapted to be restrained on the cap, thereby preventing dislocation of the arms from the associated slots.

The piston includes a region with which a crown can engage. Preferably, the crown takes the form of a ring and includes a U-shaped cross section. The U-shaped cross section defines a gap in which the region can be disposed. The crown is made of wear-resisting material and serves to preclude the piston being fretted by the arms.

There has thus been outlined, rather broadly, the more important features of the invention in order that the detailed description thereof that follows may be better understood and in order that the present contribution to the art may be better appreciated. There are additional features of the invention that will be described hereinafter and which will form the subject matter of the claims appended hereto.

DETAILED DESCRIPTION OF THE PREFERRED EMBODIMENT

Figure 1:
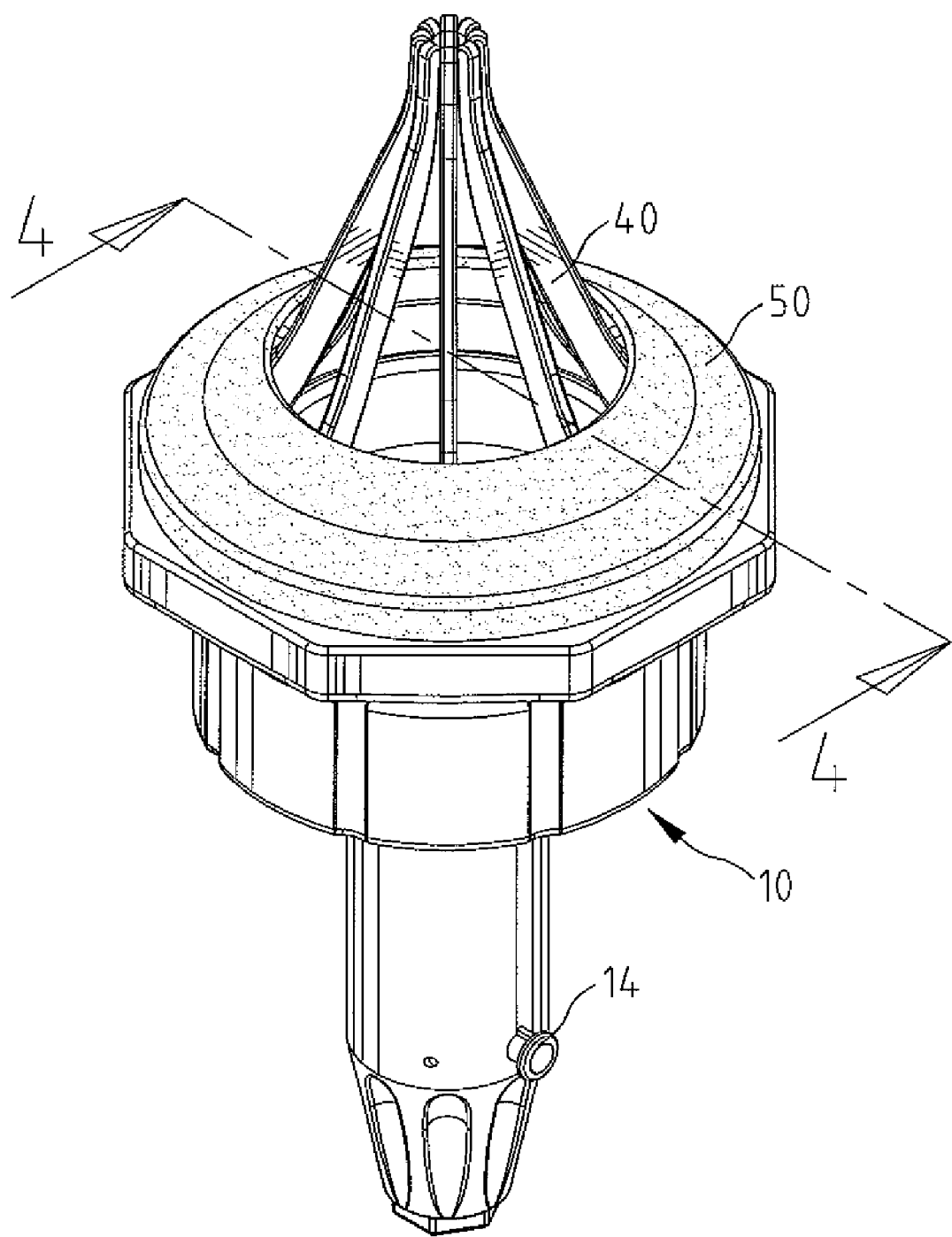
FIG. 1 is a perspective view of a boot slider in accordance with the present invention.
Figure 2:
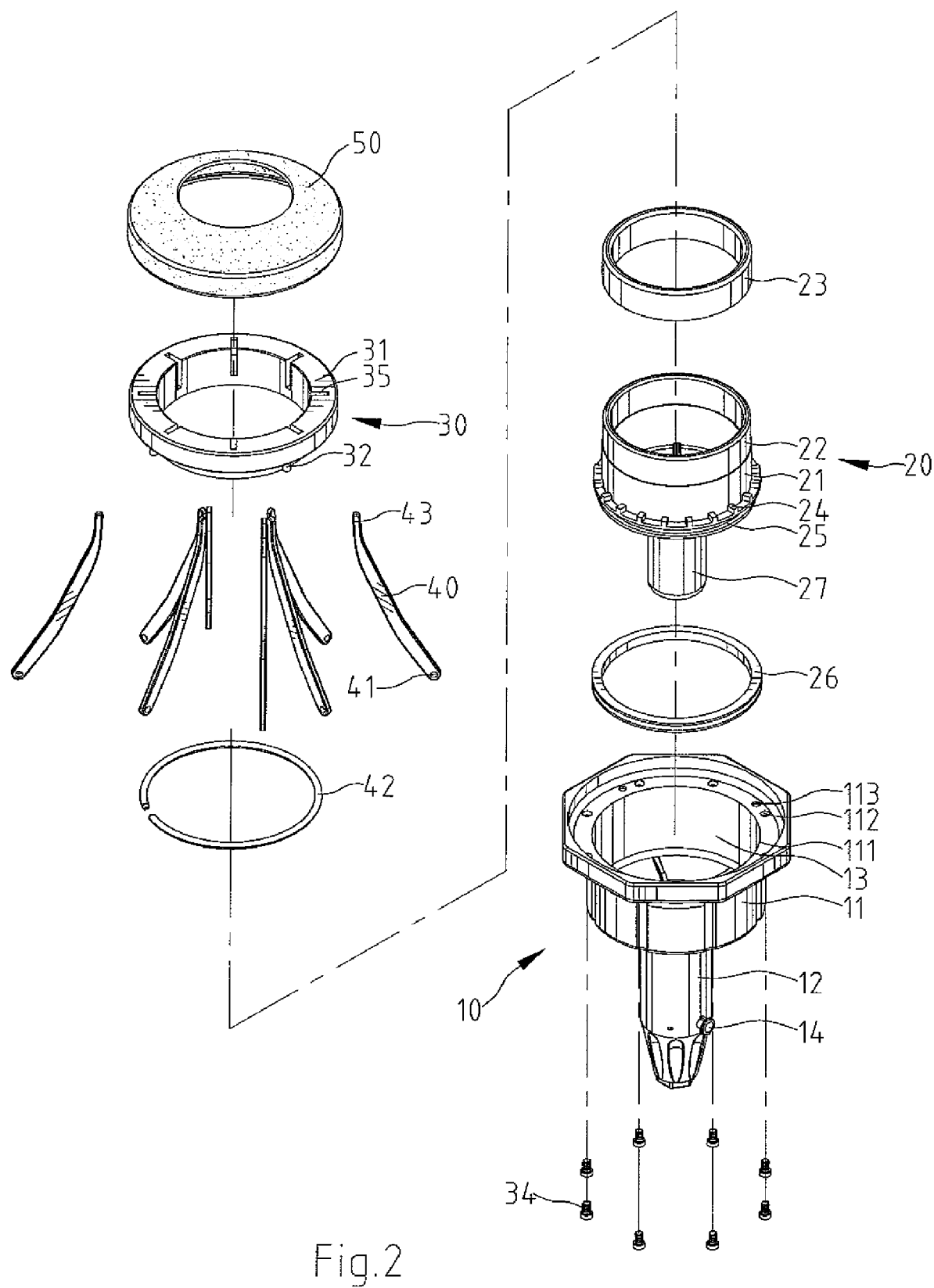
FIG. 2 is an exploded perspective view of the boot slider of FIG. 1.
Figure 3:
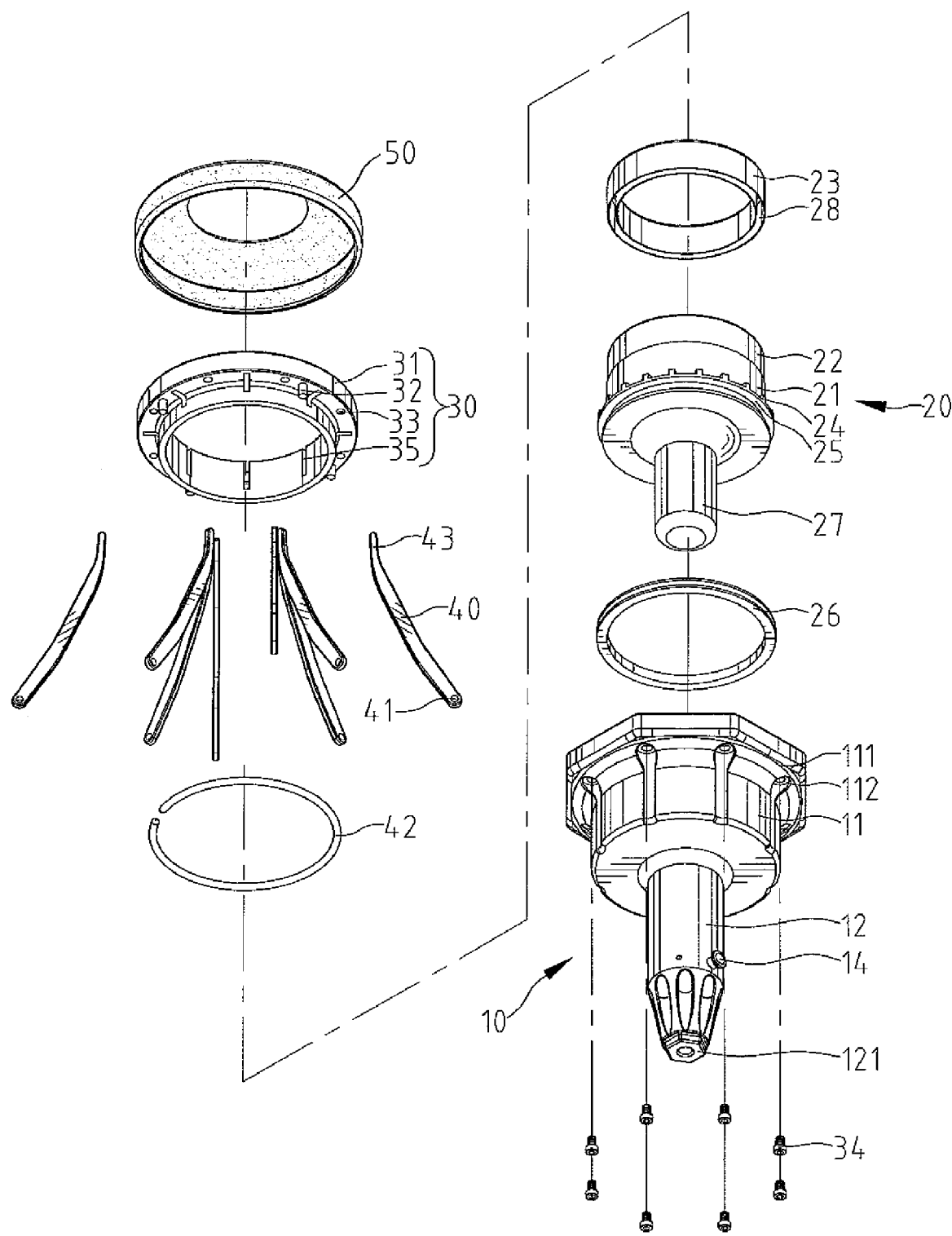
FIG. 3 is another exploded perspective view of the boot slider of FIG. 1.
Figure 4:
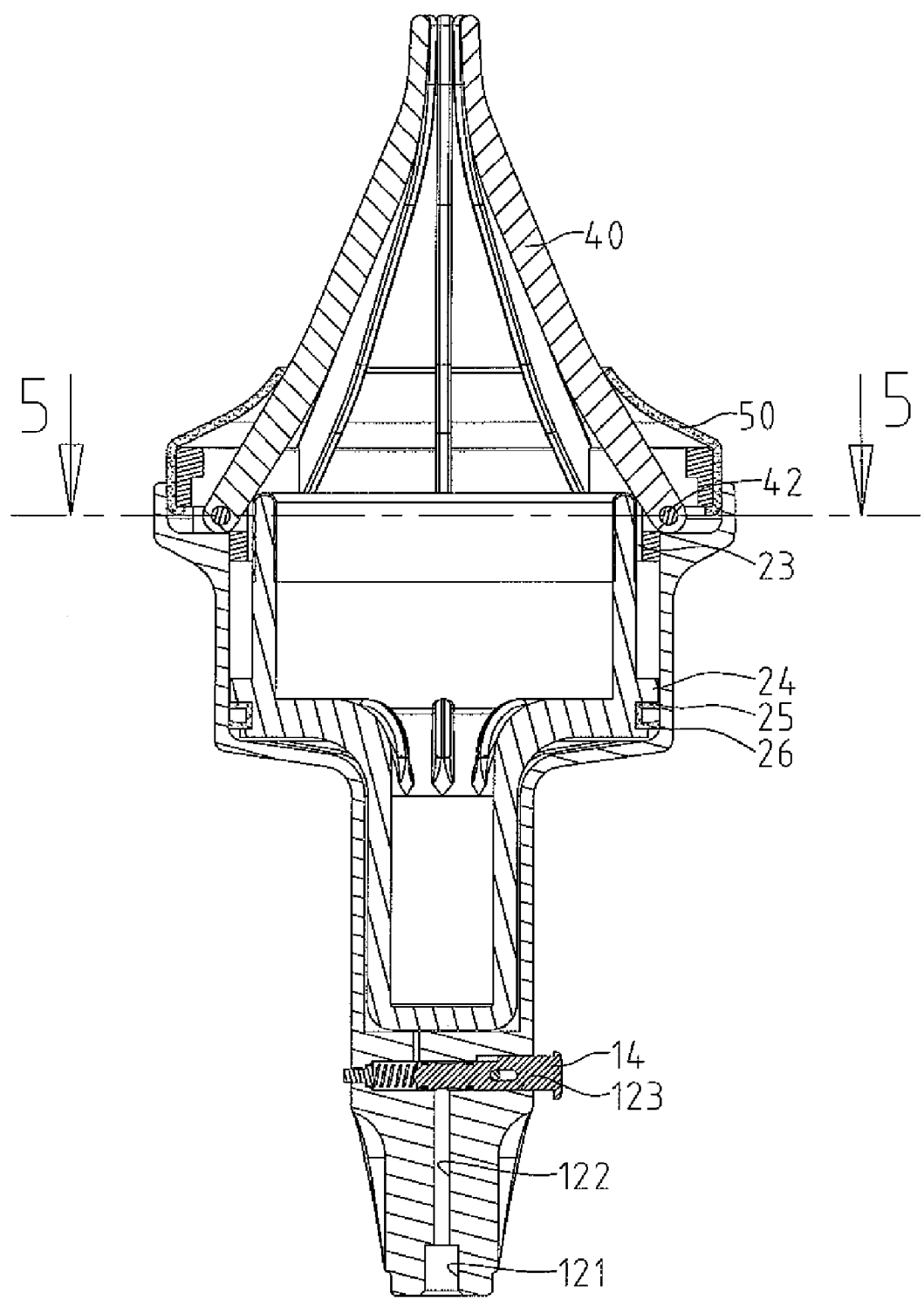
FIG. 4 is a cross-sectional view taken along line 4-4 of FIG. 1.
Figure 5:
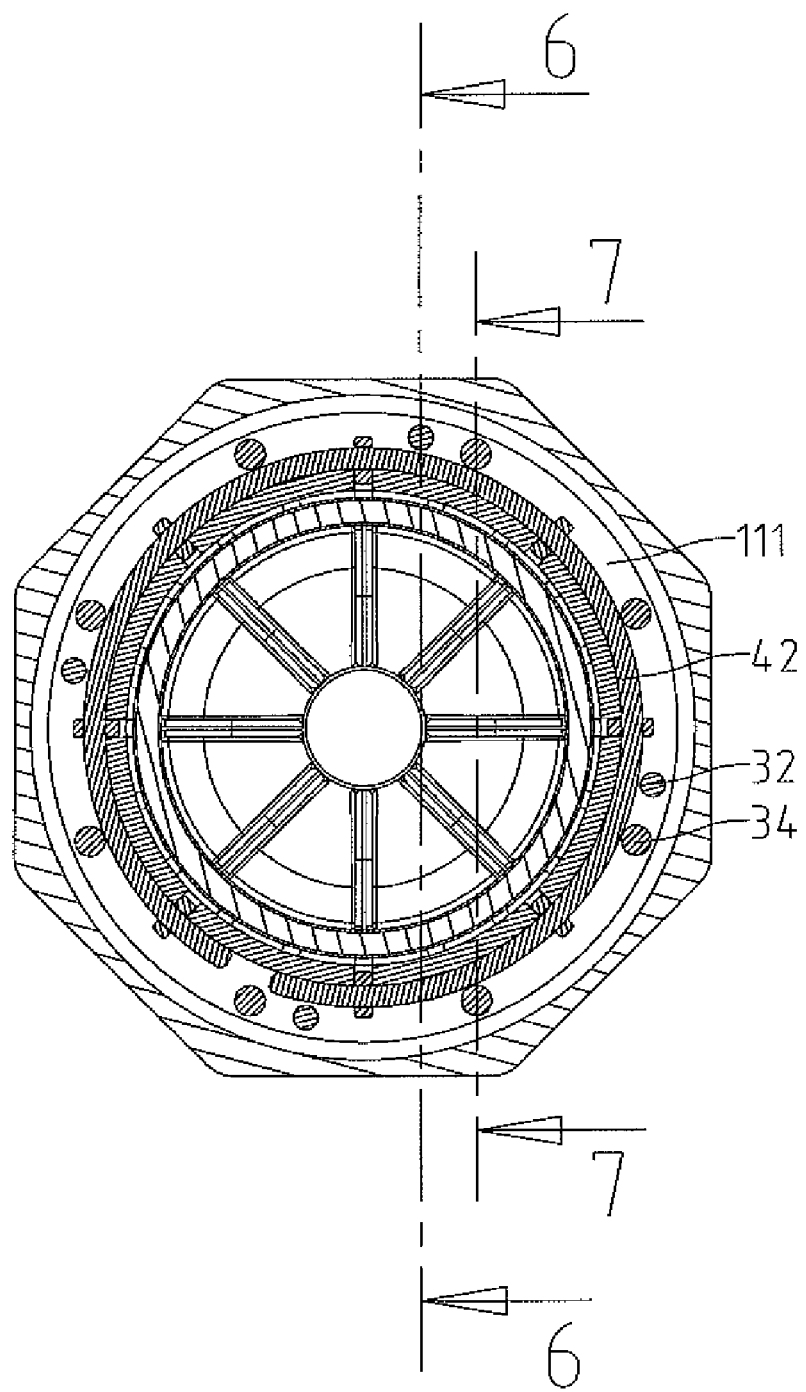
FIG. 5 is a cross-sectional view taken along line 5-5 of FIG. 4.
Figure 6:
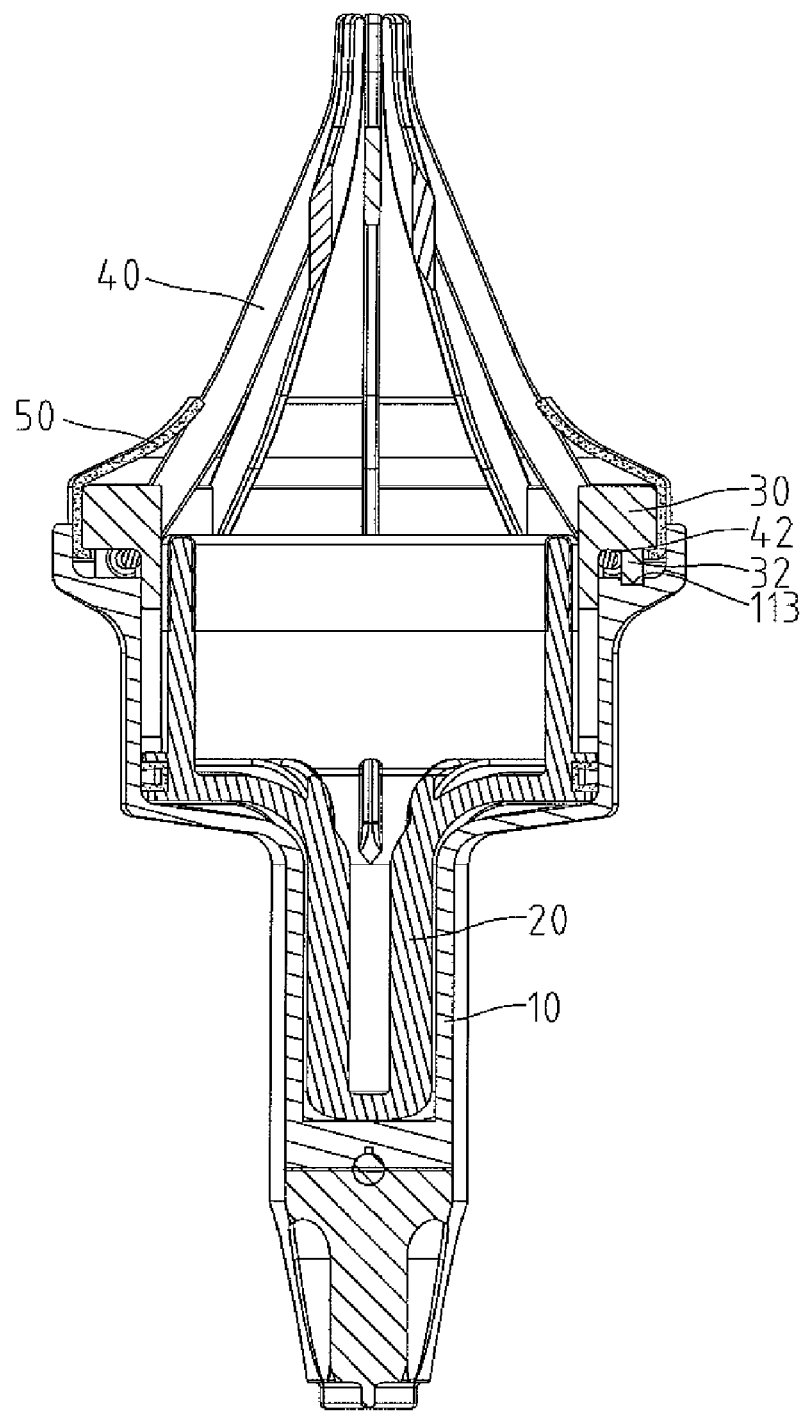
FIG. 6 is a cross-sectional view taken along line 6-6 of FIG. 5.
Figure 7:
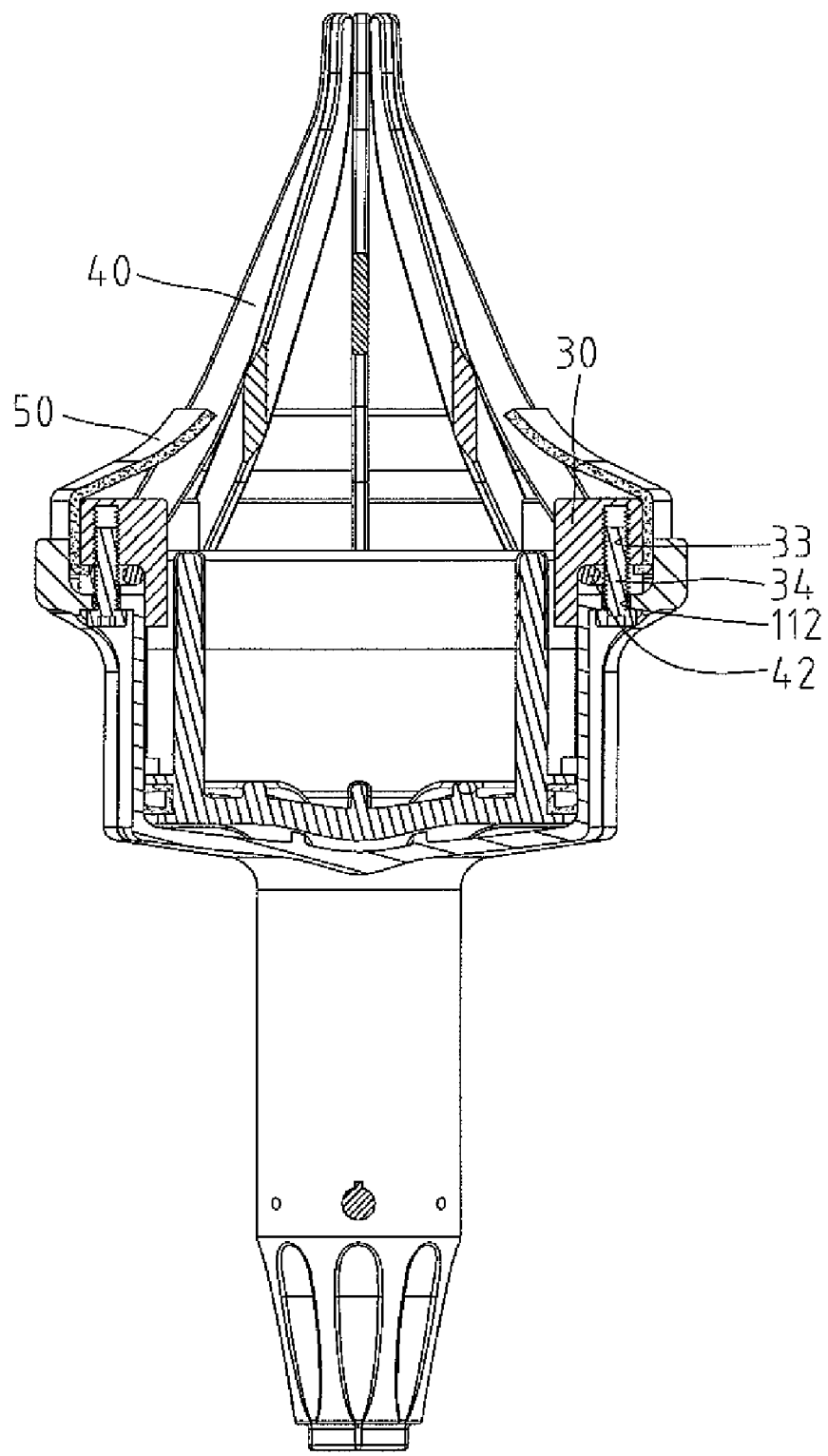
FIG. 7 is a cross-sectional view taken along line 7-7 of FIG. 5.

Referring to the drawings, a boot slider in accordance with the present invention includes a body 10 configured to have a first section 11 and a second section 12, with the first section 11 having a cross sectional area larger than that of the second section 12. A compartment 13 is delimited by walls of the first and second sections 11 and 12 and extends from the first section 11 to the second section 12. A flange 111 is located in the first section 11 of the body 10 and protrudes radially inboard from the wall thereof. Threaded holes 112 and orifices 113 are defined in the flange 111. Specifically, the threaded holes 112 extend downwardly through the flange 111, and the orifices 113 extend partially downwardly through the flange 111. Also, an inlet hole 121 is defined in the second section 12 of the body 10 and serves to allow flow of compressed air into the body 10. A channel 122 interconnects the inlet hole 121 and the compartment 13. Furthermore, a control valve 14 is disposed in a passage 123 communicating and extending transverse to the channel 122. The valve 14 is used to preclude or enable air from the inlet hole 121 to flow into the compartment 13.

A piston 20 is received in the compartment 13 and includes a first end 21 disposed in the first section 11 of the body 10 and a second end 27 disposed in the second section 12 of the body 10. A crown 23 made of wear-resisting material, such as metal, takes the form of a ring and includes an U-shaped cross section. The crown 23 is engaged at a region 22 of the first end 21. Specifically, the region 22 is a wall of the first end 21 of the piston 20 that can be received by a gap 28 defined by the U-shaped cross section. Additionally, protrusions 24 extend radially outboard from the first end 21 of the piston 20 and are equally spaced. Furthermore, a groove 25 is circumferentially defined in the first end 21 and includes a seal ring 26 disposed therein.

A cap 30 takes the shape of a ring and includes a collar 31 extending radially outboard. The collar 31 can be located on the flange 111 of the body 10. The collar 31 has stubs 32 extending downwardly, and the stubs 32 can be inserted into orifices 113 of the body 10, respectively. The collar 31 also has threaded holes 33 extending downwardly therethrough, and the threaded holes 33 correspond to the threaded holes 112 of the body 10, respectively, when the stubs 32 are received in the orifices 113. Fasteners 34 can be inserted upward into the threaded holes 112 and 33, thereby securely fastening the cap 30 to the body 10. Furthermore, the collar 31 has slots 35 equally spaced and extended radially.

Arms 40 are preferably made of cast aluminum and include a proximal end 41 and a distal end 43 respectively. A ring 42 is preferably made of metal and is inserted through the proximal ends 41 of the arms 40 so that the arms 40 can be held together. Also, the distal ends of the arms 40 can be inserted through the slots 35 respectively, and the ring 42 can be restrained underneath the collar 31, thereby preventing dislocation of the arms 40 from the associated slots 35. Furthermore, the collar 31 has a radius greater than that of the ring 42.

A flexible guard element 50 can be slipped onto the arms 40 to keep the arms 40 closed together when the boot slider is in storage.

Figure 8:
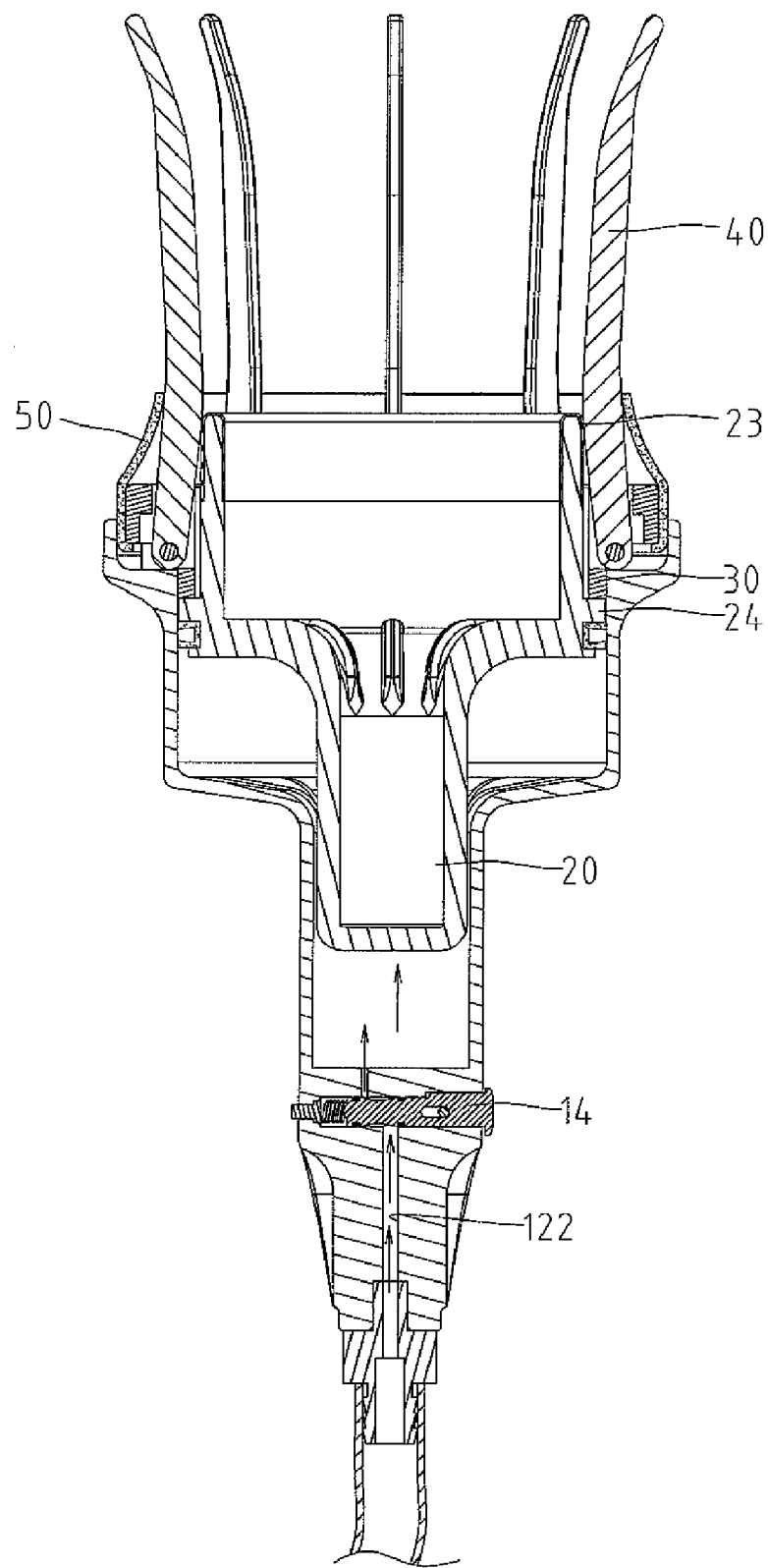
FIG. 8 is a sectional view showing arms of the boot slider being opened.
Figure 9:
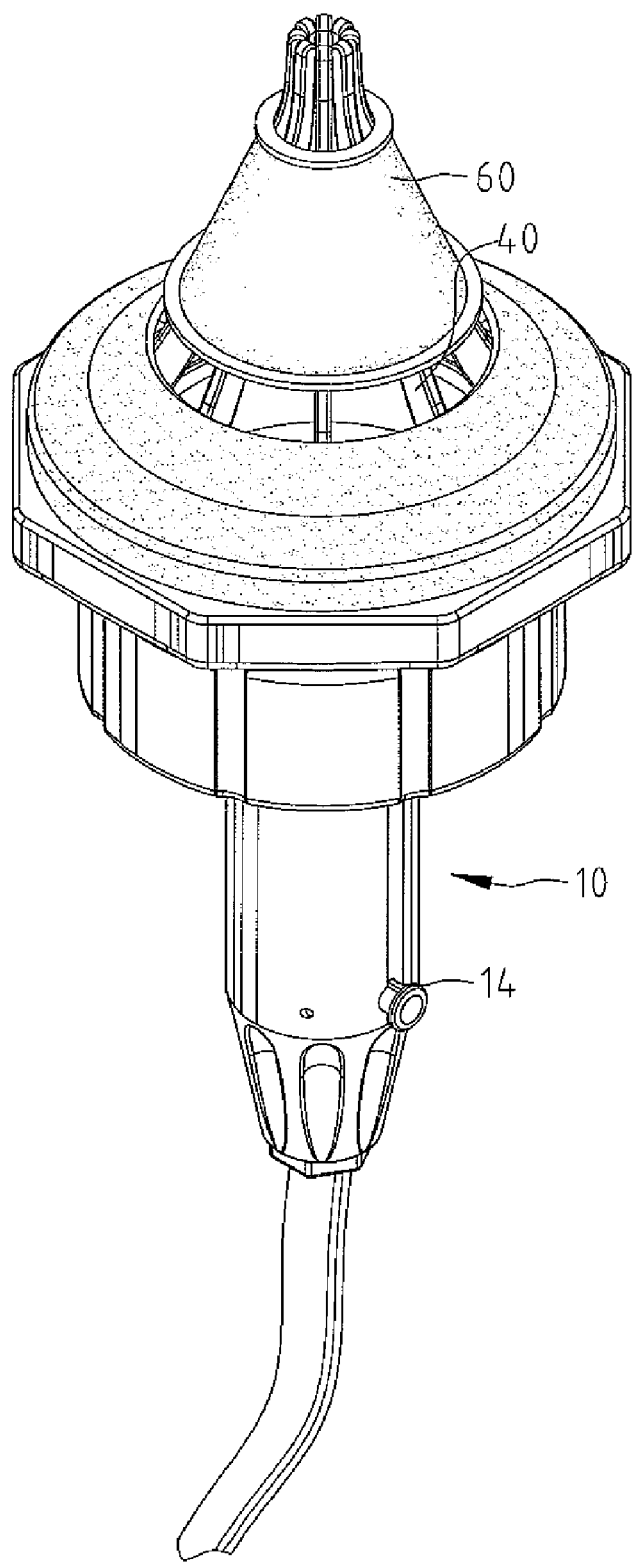
FIG. 9 is a perspective view showing a dust boot being slipped onto arms of the boot slider.
Figure 10:
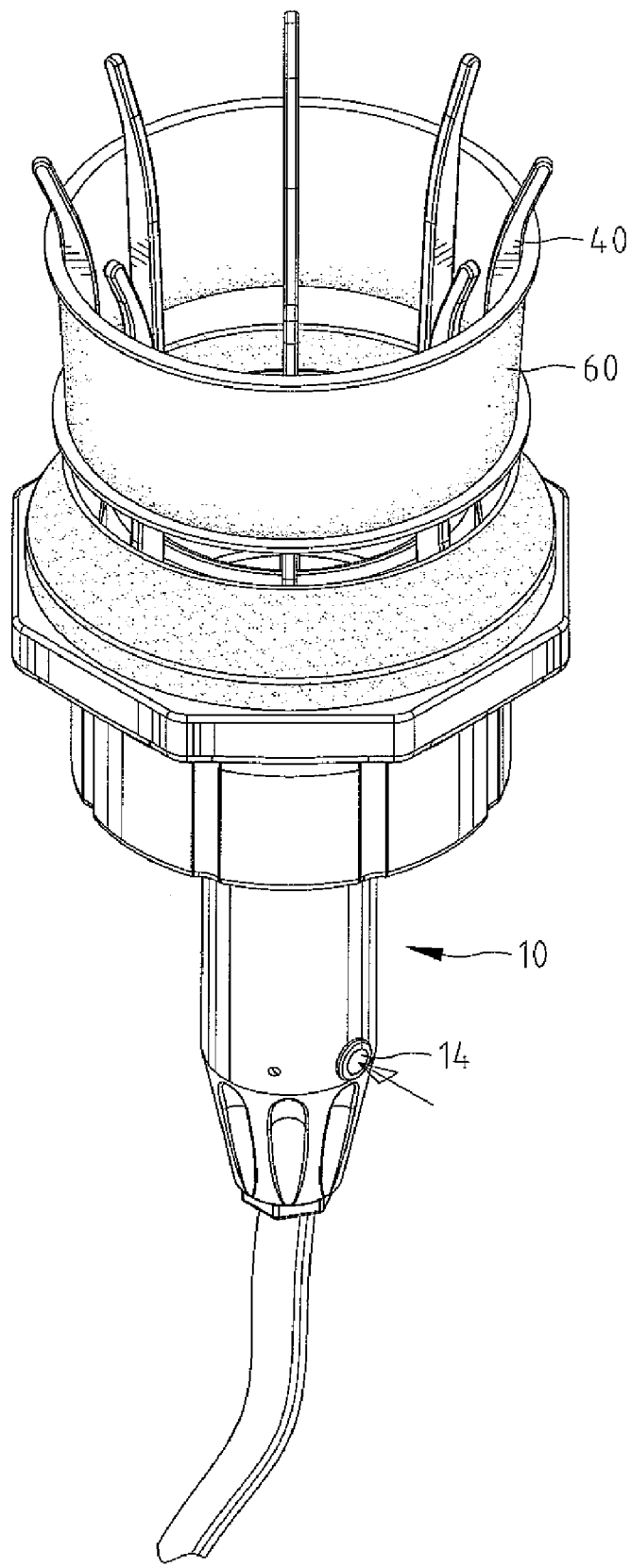
FIG. 10 is a perspective view showing the dust boot being tensioned by the arms of the boot slider.

Referring to FIGS. 9 and 10 in conjunction with FIG. 8, when the boot slider is in use, the body 10 is connected to an air compressor (not shown) at the inlet hole 121, a boot 60 is slipped onto the arms 40 and pressing the control valve 14 can permit compressed air to flow into the body 10. Specifically, the air will flow from the channel 122 to the compartment 13 and therefore pushes the piston 20 from a first position upwardly to a second position and arms 40 can be caused to open for tensioning the boot 60.

Referring to FIGS. 9 and 10 in conjunction with FIG. 8, when the boot slider is in use, the body 10 is connected to an air compressor (not shown) at the inlet hole 121. A boot 60 is slipped onto the arms 40, and pressing the control valve 14 can permit compressed air to flow into the body 10. Specifically, the air will flow from the channel 122 to the compartment 13 and therefore pushes the piston 20 from a first position upwardly to a second position, and arms 40 can be caused to open for tensioning the boot 60.

It will now be understood that the present invention comprises a novel boot slider in which the installing and uninstalling of arms 40 are eased. Also, the movement of the arms 40 can always be synchronized, so that the arms 40 are not liable to have occurrences in which some arms are not opened to the same degree as the others. Furthermore, components required for installation of the arms 40 can be substantially reduced.

Also, it will be understood that the crown 23 can prevent the arms 40 wearing the piston 20.

While the specific embodiments have been illustrated and described, numerous modifications come to mind without significantly departing from the spirit of invention, and the scope of invention is only limited by the scope of accompanying claims.

What is claimed is:

1. A boot slider comprising:
 a body including a compartment;
 a piston disposed in the compartment and moveable between a first position and a second position;
 a cap mounted in the compartment in order to restrain movement of the piston, with the cap including a plurality of slots;
 a plurality of arms, with each arm including a proximal end and a distal end, wherein the distal ends of the plurality of arms are insertable through the plurality of slots; and
 a ring inserted through the distal ends of the plurality of arms so that the plurality of arms are held together, with the ring adapted to be retained on the cap;
 wherein the arms are closed when the piston is in the first position and the arms are urged open when the piston is in the second position, wherein the body comprises a periphery wall and a flange extending radially inboard, and wherein the cap comprises a collar securely mountable to the flange.

2. The boot slider as claimed in claim 1 further comprising a crown, and wherein the piston comprises a region engagable with the crown.

3. The boot slider as claimed in claim 2 wherein the crown is made of metal.

4. The boot slider as claimed in claim 2 wherein the crown comprises a U-shaped cross section.

5. The boot slider as claimed in claim 1 wherein the flange comprises a plurality of orifices, and wherein the collar comprises a plurality of stubs received in the plurality of orifices respectively.

6. The boot slider as claimed in claim 1 wherein the cap takes the form of a ring, and wherein the collar extends radially outboard.

7. The boot slider as claimed in claim 6 wherein the collar has a radius, and wherein the ring has a radius smaller than that of the collar.

8. The boot slider as claimed in claim 1 wherein the body comprises a first section and a second section, with the first section having a cross section area greater than that of the second section, and with the compartment extended from the first section to the second section, and wherein the piston comprises a first end disposed in the first section and a second end disposed in the second section respectively.

9. The boot slider as claimed in claim 8 further comprising a seal ring, and wherein the first end of the piston comprises a groove circumferentially defined therein and in which the seal ring can be received.

10. The boot slider as claimed in claim 1 further comprising a guard element adapted to be slipped on the plurality of arms, allowing the arms to be closed.

11. A boot slider comprising:
 a body including a compartment;
 a piston disposed in the compartment and moveable between a first position and a second position;
 a cap mounted in the compartment in order to restrain movement of the piston, with the cap including a plurality of slots;
 a plurality of arms, with each arm including a proximal end and a distal end, wherein the distal ends of the plurality of arms are insertable through the plurality of slots;
 a crown; and
 a ring inserted through the distal ends of the plurality of arms so that the plurality of arms are held together, with the ring adapted to be retained on the cap;
 wherein the arms are closed when the piston is in the first position and the arms are urged open when the piston is in the second position, wherein the crown comprises a U-shaped cross section, wherein the piston comprises a region engagable with the crown, wherein the crown comprises a gap defined by the U-shaped cross section, and wherein the region of the piston defines a wall received in the gap.

12. The boot slider as claimed in claim 11 further comprising a guard element adapted to be slipped on the plurality of arms, allowing the arms to be closed.

13. The boot slider as claimed in claim 11 wherein the crown is made of metal.

14. The boot slider as claimed in claim 11 wherein the body comprises a periphery wall and a flange extending radially inboard, and wherein the cap comprises a collar securely mountable to the flange.

15. The boot slider as claimed in claim 14 wherein the flange comprises a plurality of orifices, and wherein the collar comprises a plurality of stubs received in the plurality of orifices respectively.

16. The boot slider as claimed in claim 15 wherein the cap takes the form of a ring, and wherein the collar extends radially outboard.

17. The boot slider as claimed in claim 16 wherein the collar has a radius, and wherein the ring has a radius smaller than that of the collar.

18. The boot slider as claimed in claim 11 wherein the body comprises a first section and a second section, with the first section having a cross section area greater than that of the second section, and with the compartment extended from the first section to the second section, and wherein the piston comprises a first end disposed in the first section and a second end disposed in the second section respectively.

19. The boot slider as claimed in claim 18 further comprising a seal ring, and wherein the first end of the piston comprises a groove circumferentially defined therein and in which the seal ring can be received.

* * * * *